R. STEWART.
PROCESS OF PRODUCING ACID MONOCALCIUM PHOSPHATE.
APPLICATION FILED JUNE 17, 1914.
1,137,806.
Patented May 4, 1915.
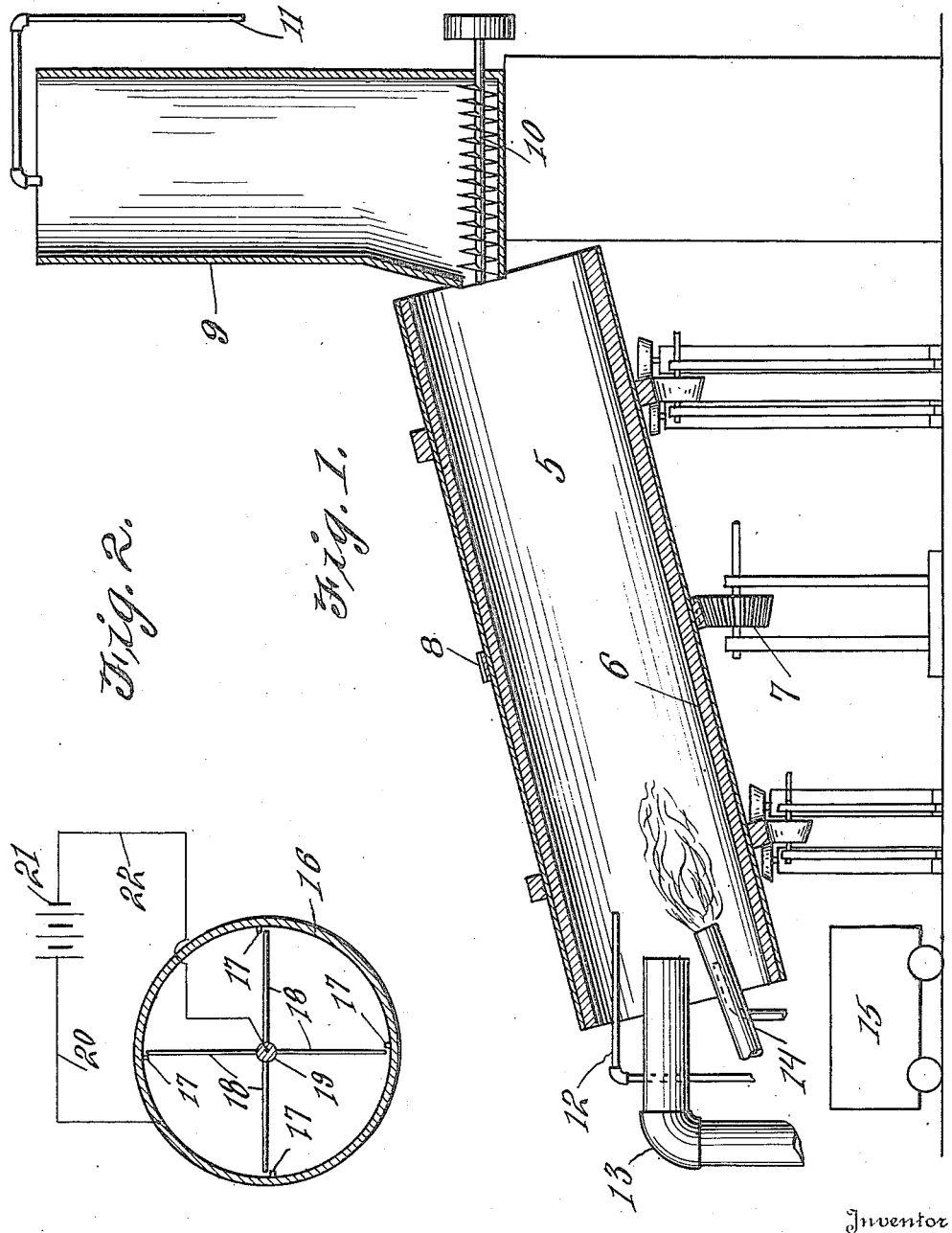
Witnesses
Wynne Johnson
Inventor
Robert Stewart
By C. L. Parker, Attorney

UNITED STATES PATENT OFFICE.

ROBERT STEWART, OF LOGAN, UTAH.

PROCESS OF PRODUCING ACID MONOCALCIUM PHOSPHATE.

1,137,806.   Specification of Letters Patent.   Patented May 4, 1915.

Application filed June 17, 1914. Serial No. 845,711.

*To all whom it may concern:*

Be it known that I, ROBERT STEWART, a citizen of the United States, residing at Logan, in the county of Cache and State of Utah, have invented certain new and useful Improvements in Processes of Producing Acid Monocalcium Phosphate, of which the following is a specification.

My invention relates to a process of producing, isolating and recovering acid monocalcium phosphate by the treatment of phosphate rock or tri-calcium phosphate with smelter smoke, in the presence of steam or water vapor.

An important object of the invention is to provide a process for the production of acid mono-calcium phosphate from tri-calcium phosphate, by the employment of smelter smoke as a reagent, whereby the sulfur dioxid and tri-oxid in the smelter smoke are removed by being converted into calcium sulfate.

In the accompanying drawings forming a part of this specification and in which like numerals are employed to designate like parts throughout the same, Figure 1 is a central longitudinal sectional view through apparatus within which my process may be advantageously practised, and, Fig. 2 is a partly diagrammatic view of an electrical oxidizing apparatus.

In accordance with my process, phosphate rock or tri-calcium phosphate is heated with smelter smoke in the presence of steam or water vapor, whereby acid mono-calcium phosphate and acid calcium sulfite are produced as illustrated in the following equation:

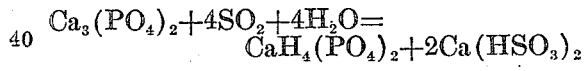

The presence of the acid calcium sulfite in the resultant solution or mixture prevents the recovery of the acid mono-calcium phosphate. Upon the concentration by evaporation of this solution, for the recovery of the acid mono-calcium phosphate, the soluble acid calcium sulfite is decomposed with the formation of the normal calcium sulfite and the liberation of sulfur dioxid, as is shown in the following equation:

The acid mono-calcium phosphate acts upon and decomposes part of the normal calcium sulfite with the production of di-calcium phosphate as shown in the following equation:

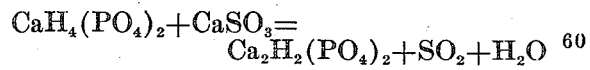

This di-calcium phosphate does not possess as great an agricultural value as the acid mono-calcium phosphate. It is therefore evident that the acid mono-calcium phosphate cannot be recovered as such without removing the acid calcium sulfite. I remove the acid calcium sulfite by oxidizing the same. To accomplish this the solution thus obtained is subjected to the action of an oxidizing electric current or other oxidizing agent, whereby the acid calcium sulfite is converted into calcium sulfate and sulfuric acid, as illustrated in the following equation:

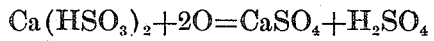

After this has been done, the solution may be readily concentrated by evaporation, without the decomposition of the acid mono-calcium phosphate, whereby the same may be readily recovered.

In the drawings, wherein for the purpose of illustration is shown apparatus in connection with which my process may be advantageously practised, the numeral 5 designates a longitudinally inclined rotatable tube, preferably formed of iron and having its inner surface covered with refractory material 6. This tube is rotatably supported in any well known or preferred manner, and receives rotation from a pinion 7, engaging an annular gear 8, rigidy secured to the exterior of the tube. Disposed near the upper end of the tube 5 is a vertical stationary tube 9, for holding the phosphate material or rock, which is preferably suitably broken before being fed therein. This phosphate rock is fed from the lower end of the vertical tube 9 into the upper end of the inclined rotatable tube 5 by a spiral conveyer 10, driven by any suitable means.

The numeral 11 designates a sprinkler pipe for discharging water upon the phosphate rock in the vertical tube 9.

The numeral 12 designates a steam supply pipe discharging into the tube 5 in the presence of the phosphate rock.

The numeral 13 designates a relatively large pipe, discharging smelter smoke into the tube 5 in the presence of the phosphate rock. The tube 5 is heated by any suitable means, such means being illustrated in the form of a blow pipe burner 14, discharging its flame into the lower portion of the tube. The material discharging from the lower end of the tube 5 is preferably collected in a car 15 or other receptacle and is carried to an oxidizing apparatus, preferably an electrically operated oxidizing apparatus.

In Fig. 2, I have shown a somewhat diagrammatic view of an oxidizing apparatus, the same comprising a shell 16, formed of iron or the like and carrying interior contacts 17, adapted to be engaged and disengaged by revolving contact arms 18, carried by a hub 19 insulated from the shell 16. A wire 20 is electrically connected with the hub 19 and with one pole of a source of current 21 and a wire 22 is connected with the opposite pole of this source of current and the shell 16. The material is removed from the shell 16 and fed into a suitable evaporating pan (not shown), where the same is heated and concentrated by evaporation.

It is to be understood that the form of my process herein described is to be taken as a preferred example of the same, and that various changes in the practice of the steps thereof may be resorted to without departing from the spirit of the invention or the scope of the subjoined claims.

Having thus described my invention, I claim:—

1. The herein described process, which consists in subjecting phosphate rock to the action of smelter smoke in the presence of steam, whereby acid mono-calcium phosphate and acid calcium sulfite are produced, subjecting the solution thus obtained to the action of an oxidizing agent, and recovering the acid mono-calcium phosphate in the solution without decomposing the same.

2. The herein described process, which consists in subjecting phosphate rock to the action of smelter smoke in the presence of steam whereby acid mono-calcium phosphate and acid calcium sulfite are produced, subjecting the solution thus obtained to the action of an oxidizing electric current, and recovering the acid mono-calcium phosphate in solution without decomposing the same.

3. The herein described process, which consists in subjecting phosphate rock to the action of smelter smoke in the presence of heat and water whereby acid mono-calcium phosphate and acid calcium sulfite are produced, oxidizing the acid calcium sulfite whereby it is converted into calcium sulfate and sulfuric acid, and concentrating the solution for recovering the acid mono-calcium phosphate without decomposing the same.

4. The herein described process, which consists in subjecting phosphate rock to the action of smelter smoke in the presence of heat and water whereby acid mono-calcium phosphate and acid calcium sulfite are produced, oxidizing the acid calcium sulfite, and recovering the acid mono-calcium phosphate, substantially as described.

In testimony whereof I affix my signature in presence of two witnesses.

ROBERT STEWART.

Witnesses:
 JOHN STEWART,
 C. T. HIRST.